United States Patent [19]

Stowell Davin et al.

[11] Patent Number: 4,963,115
[45] Date of Patent: Oct. 16, 1990

[54] MULTIPURPOSE CONTAINER TOY WITH MOUNTABLE WHEELS

[75] Inventors: Stowell Davin, New York; Jean M. Gerth, Brooklyn, both of N.Y.

[73] Assignee: Smart Design, Inc., New York, N.Y.

[21] Appl. No.: 452,051

[22] Filed: Dec. 18, 1989

[51] Int. Cl.$^5$ .................... A63H 17/00; A63H 27/00; B62B 1/04; B60B 27/02

[52] U.S. Cl. ........................................ 446/96; 446/88; 446/78; 446/465; 280/30; 280/103; 301/111; 301/118

[58] Field of Search .............. 446/96, 95, 94, 93, 446/88, 86, 85, 102, 104, 121, 122, 123, 78, 77, 76, 75, 73, 72, 71, 465, 469, 470, 471; 280/30, 93, 96.1, 103; 301/111, 124 R, 118

[56] References Cited

U.S. PATENT DOCUMENTS

| | | | |
|---|---|---|---|
| 2,577,702 | 12/1951 | De Swart | 446/121 X |
| 3,091,888 | 6/1963 | Patch | 446/94 |
| 3,497,992 | 3/1970 | Balter | 446/76 |
| 4,193,639 | 3/1980 | Pauley et al. | 301/111 X |
| 4,270,305 | 6/1981 | Samuels | 446/95 |
| 4,589,702 | 5/1986 | Bach et al. | 301/111 X |
| 4,690,656 | 9/1987 | Friedman et al. | 446/465 X |
| 4,762,513 | 8/1988 | Choy et al. | 446/378 X |
| 4,813,903 | 3/1989 | Furukawa et al. | 446/95 X |

FOREIGN PATENT DOCUMENTS

| | | | |
|---|---|---|---|
| 2402457 | 5/1979 | France | 446/469 |
| 2414348 | 9/1979 | France | 446/71 |
| 1347963 | 10/1987 | U.S.S.R. | 446/93 |

Primary Examiner—Robert A. Hafer
Assistant Examiner—D. Nea Muir
Attorney, Agent, or Firm—Michael Ebert

[57] ABSTRACT

A construction toy set whose main component is a cubical open-top box, the bottom and side walls of which are divided into quadrants, each having a keyhole therein and a coupling collar encircling the keyhole and projecting from the quadrant. Also included in the set are cylindrical spacers that fit over the collars and extend therefrom, wheels having cylindrical hubs that can slip over the spacers which then function as axles, and hub caps that rest against the outer end of the spacers or the wheel hubs, each cap having a center keyhole matching the quadrant keyhole. The components can be assembled and interconnected to create different structures by means of connector bolts each having a key at one end capable of passing through the keyholes. Thus to create a wheeled wagon from the components, spacers are fitted over quadrant coupling collars on opposing side walls of the box to serve as axles for front and rear wheels, hub being applied to the outer ends of the spacers, after whcih a connector bolt is inserted in the center keyhole of each hub cap. The key of the bolt passes through the related quadrant keyhole, after which the bolt is turned to a locking position in which the key is not of registration with the quadrant keyhole.

14 Claims, 5 Drawing Sheets

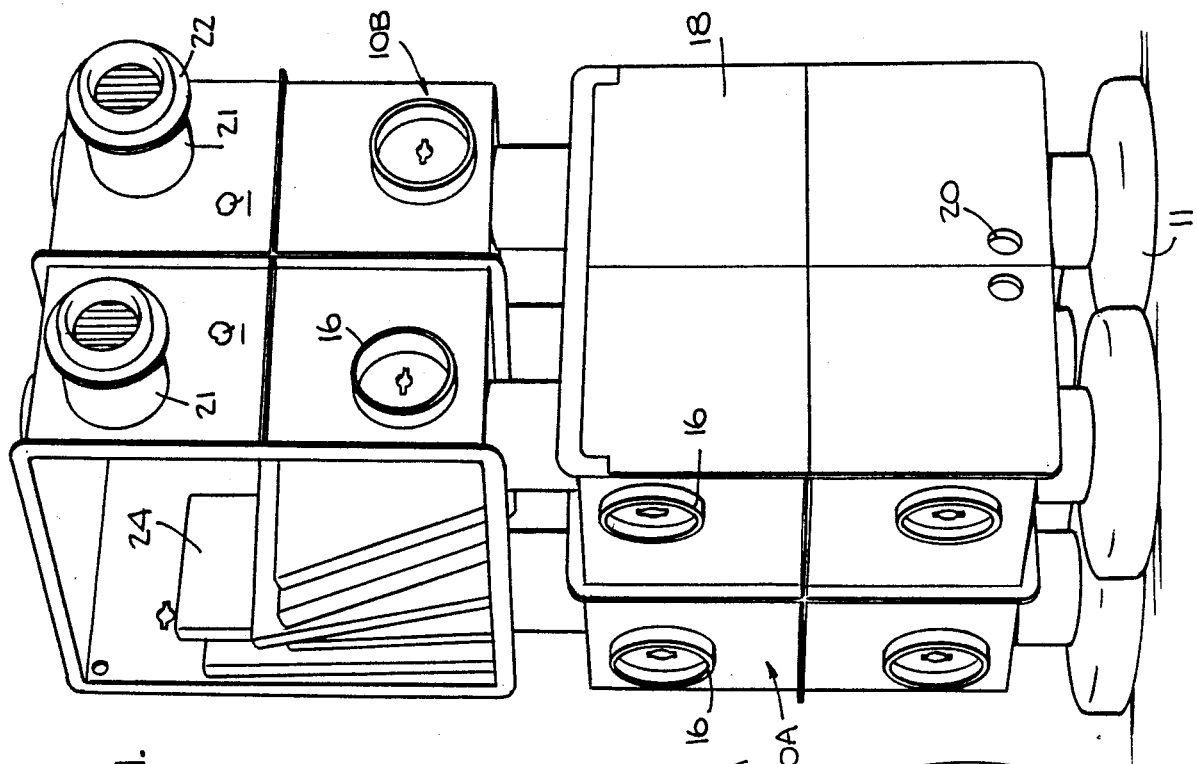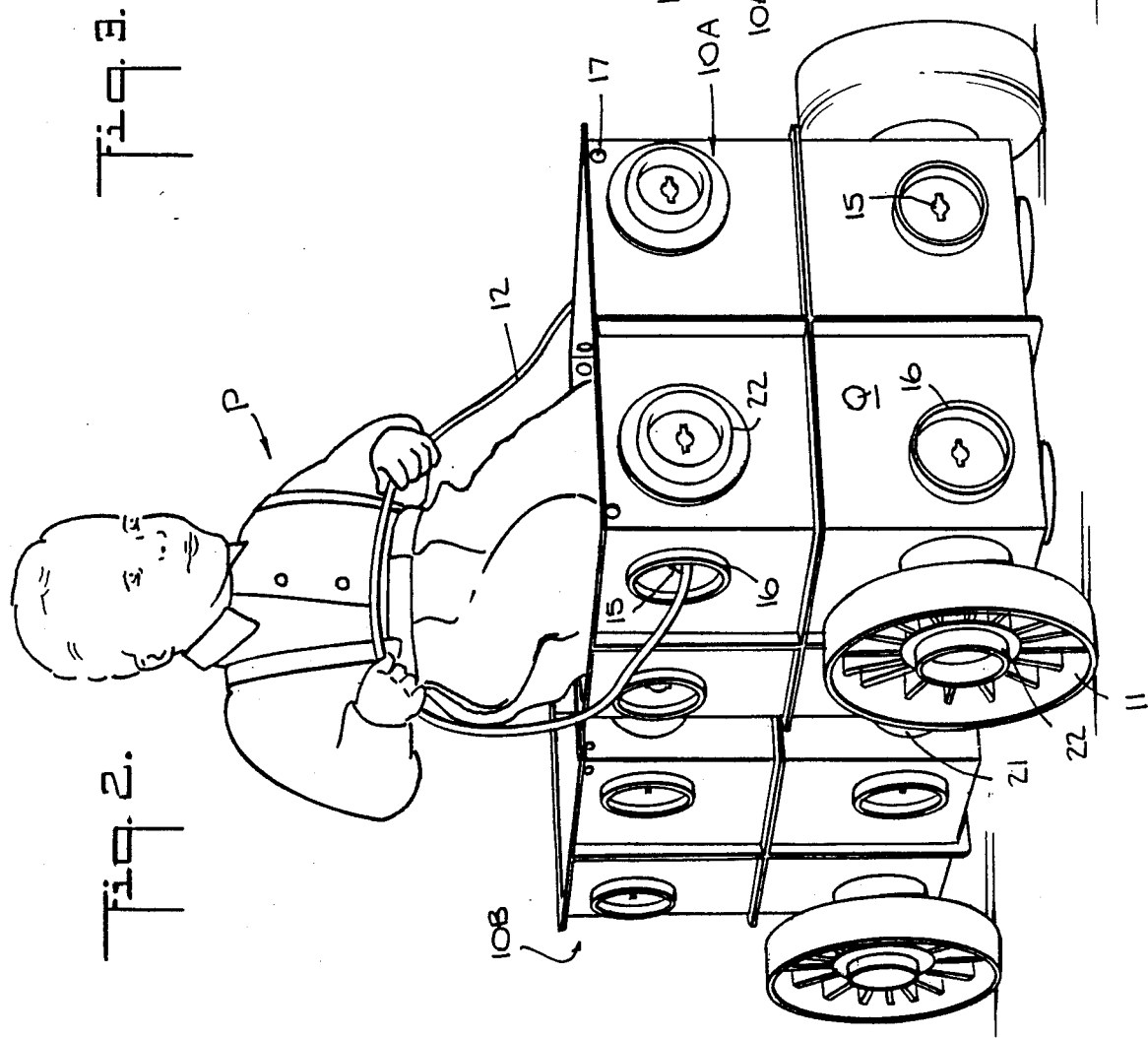

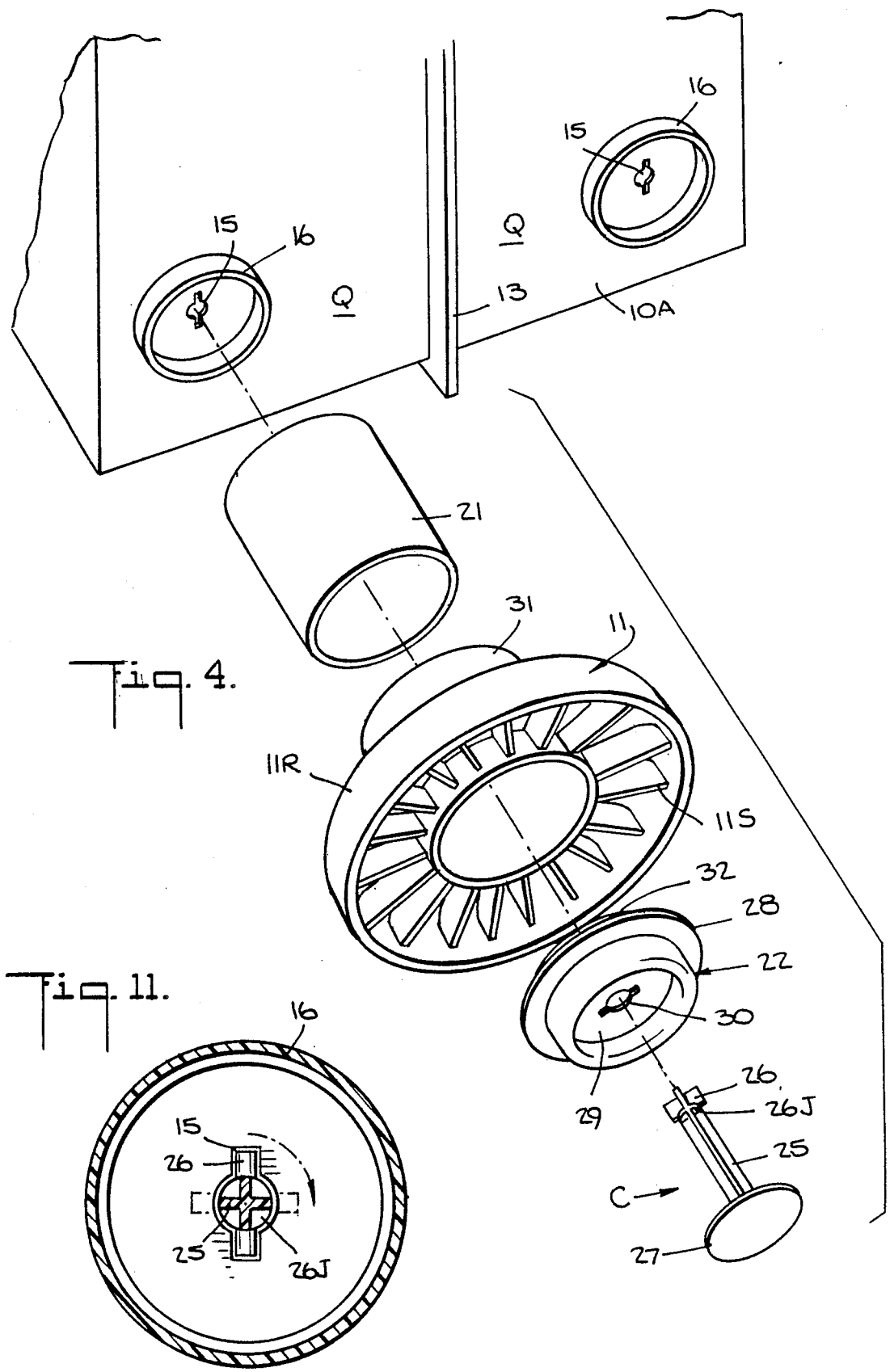

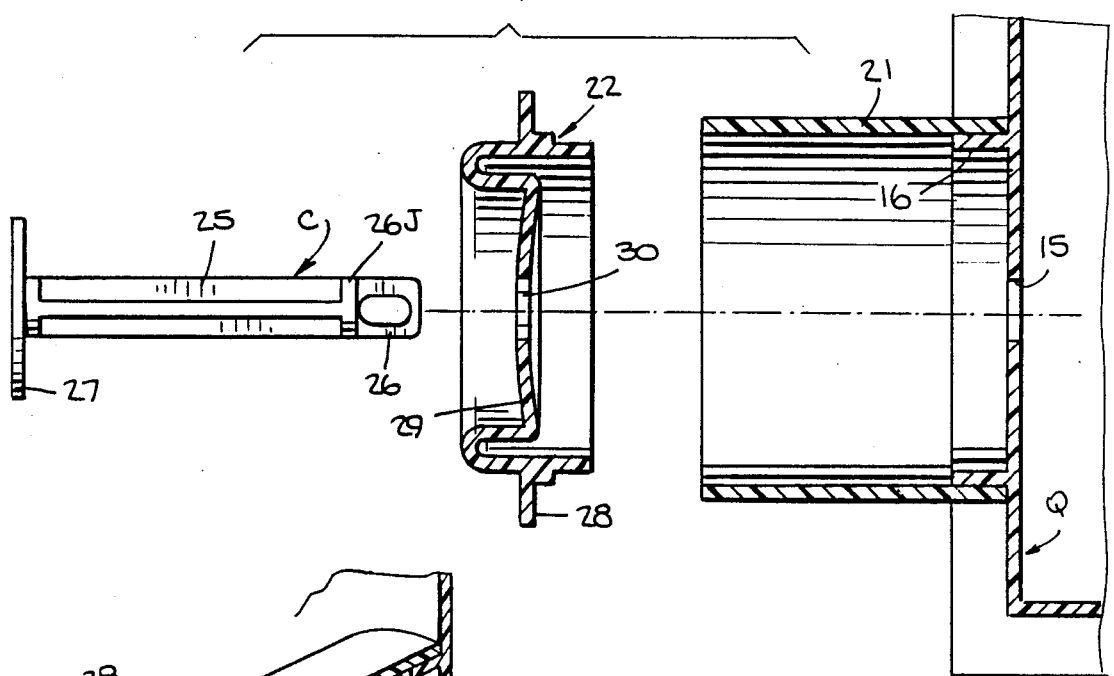
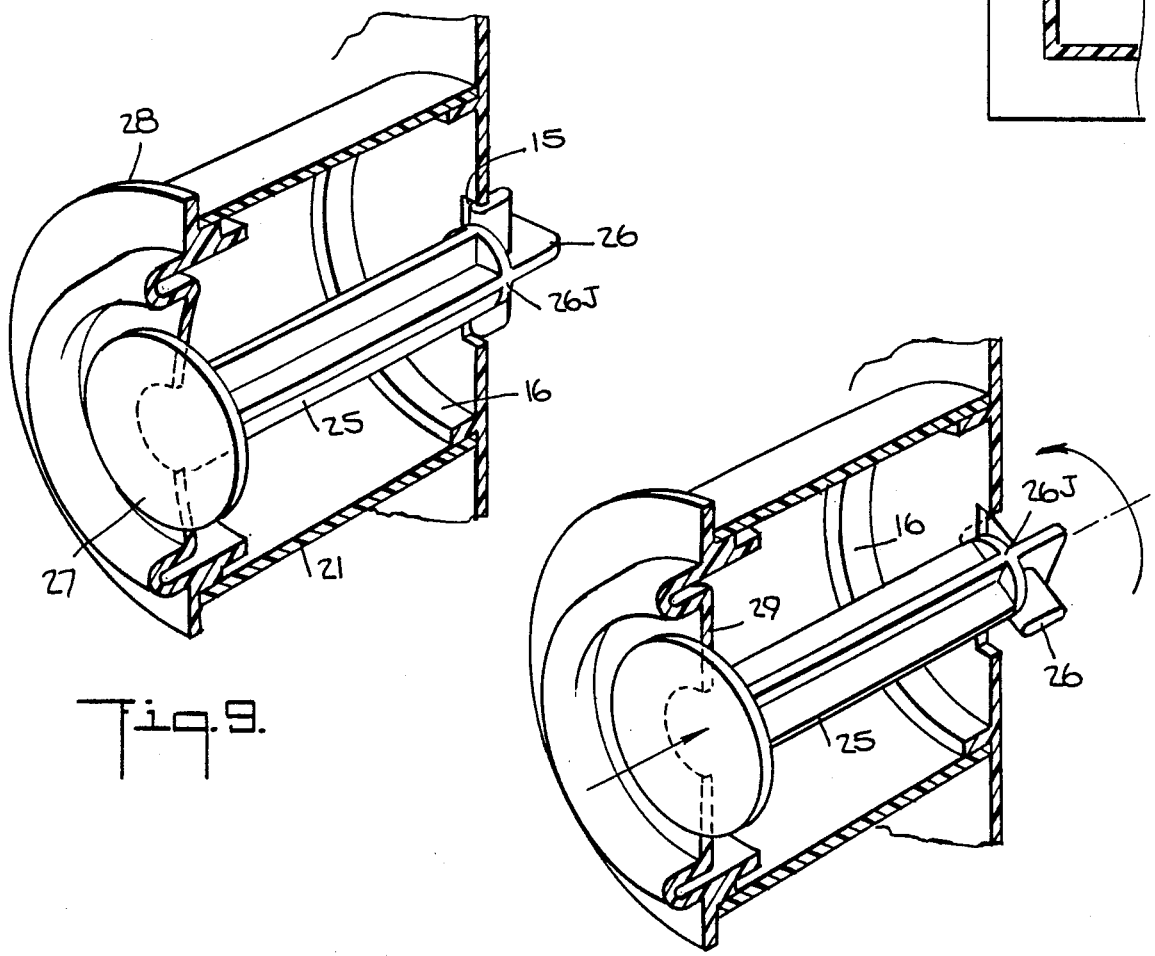

MULTIPURPOSE CONTAINER TOY WITH MOUNTABLE WHEELS

BACKGROUND OF INVENTION

1. Field of Invention

This invention relates generally to construction toys, and more particularly to a construction toy having a set of components which may be assembled and interconnected by connector bolts to create diverse structures such as one or two section wagons, a two-tier storage cabinet, or a robot, depending on how the player puts together the available components.

2. Status of Prior Art

The ideal construction toy for children of pre-school age is one having sustained play value so that the player enjoys playing with the toy and does not quickly lose interest therein, and which also possesses educational value so that in the course of play, the player acquires basic manual skills and learns fundamental principles of construction.

Construction toys, such as the popular LEGGO set, usually take the form of building blocks or modules which can be interfitted, thereby making it possible for the player to erect various structures, block-by-block. Unless the player has available a considerable number of modules, and for this purpose he may have to combine several LEGGO sets, the structures which can be built by the player are on a small scale.

Though pre-school children are small, they live in a world of relatively large objects. In play, a child seeks to recreate the real world, but he cannot do so with a construction toy whose interfitting modules only capable of forming small scale objects.

The need exists, therefore, for a construction toy which includes large scale components, and which makes it possible for a child to exercise his imagination and creative abilities to erect imposing structures, but only if the nature of the construction toy is such that the player is able to assemble from the available components a variety of structures.

Thus a construction toy having a set of components which when put together by the child creates a wheeled wagon large enough for the child to occupy and ride, has a strong appeal, for the child can not only enjoy the role of builder, but he can then actively play with the wagon he built. However, if all the child can make from the components of a construction toy set is a wagon, this construction toy then has limited educational and play value, and the child's interest in the toy may not be long lasting.

The Freelander et al. U.S. Pat. No. 4,170,083 discloses a construction toy in which wheels are mountable on a box having holes in its walls to receive wheel axles. The Munnix U.S. Pat. No. 4,624,647 shows a hollow plastic part to which a wheel is attached by a hub pushed onto a stud so that the wheel is free to turn.

The present invention provides in a construction toy set a connector bolt to interconnect the components and which requires no tool to install. Of prior art interest in this regard is the Fischer et al. U.S. Pat. No. 3,811,219, in which a toy is provided with slots having diametrically-opposed wings into which one may insert a connector having a key of corresponding shape. By turning the key 90 degrees, the connector is locked in place.

The Dearling U.S. Pat. No. 2,712,200 shows a toy having interlocking parts with cruciform slots, making it possible to interlock the parts.

SUMMARY OF INVENTION

In view of the foregoing, the main object of this invention is to provide a construction toy set that has strong educational as well as play value, for the set components when assembled and joined together by the player are capable of creating diverse structures, such as a single or double section wagon, a robot, and a two-tier storage cabinet, depending on how the player exercises his imagination and puts together the available components.

More particularly, an object of this invention is to provide a toy set of the above type which lends itself to ready assembly, and which requires no tools for this purpose, the components of the assembly being held together by removable connector bolts which have only to be manually turned to effect a locking or unlocking action, whereby the structure created by the player can readily be disassembled.

A significant feature of the invention is that the components comprising the toy construction set—namely, open-top boxes, wheels, spacers and hubcaps—are each capable of carrying out more than one structural function, depending on the creative imagination of the player. Thus a box may serve as the body of a wheeled wagon or as a storage box having a removable hinged cover, the spacers may serve not only as spacers but as wheel axles or as pedestals, and the hub caps may also serve as the simulated eyes of a robot or as the headlights of a vehicle.

Also an advantage of the invention is that the main component of the construction set is a cubical box which can serve as the container for the other components for purposes of packaging, shipment, or storage.

Another object of the invention is to provide a safe construction toy whose components are fabricated of synthetic plastic, light-weight material that can be handled by children without difficulty. Thus even if two large cubical plastic box components are stacked one above the other and joined together to create a two-tier structure, the child requires no assistance in setting up this structure, which in the eyes of the child is tall and imposing.

Yet another object of the invention is to provide a construction toy set whose components may be mass produced at low cost.

Briefly stated, these objects are attained in a construction toy set whose main component is a cubical open-top box, the bottom and side walls of which are divided into quadrants, each having a keyhole therein and a coupling collar encircling the keyhole and projecting from the quadrant. Also included in the set are cylindrical spacers that fit over the collars and extend therefrom, wheels having cylindrical hubs that can slip over the spacers which then function as axles, and hub caps that rest against the outer end of the spacers or the wheel hubs, each cap having a center keyhole matching the quadrant keyhole.

The components can be assembled and interconnected to create different structures by means of connector bolts each having a key at one end capable of passing through the keyholes. Thus to create a wheeled wagon from the components, spacers are fitted over quadrant coupling collars on opposing side walls of the box to serve as axles for front and rear wheels, hub caps being applied to the outer ends of the spacers, after which a connector bolt is inserted in the center keyhole of each hub cap. The key of the bolt passes through the related quadrant keyhole, after which the bolt is turned to a locking position in which the key is out of registration with the quadrant keyhole.

BRIEF DESCRIPTION OF DRAWINGS

For a better understanding of the invention as well as other objects and further features thereof, reference is made to the following detailed description to be read in conjunction with the accompanying drawings, wherein:

FIG. 2 shows a double-section wheeled vehicle constructed from the components of the set;

FIG. 3 shows a two-tier cabinet constructed from the components of the set;

FIG. 4 is an exploded view of a wheel sub-assembly;

FIG. 8 is an exploded view of the interconnected component shown in FIG. 5;

FIG. 9 is a cut-away perspective view of the interconnected components shown in FIG. 5, the connector bolt being shown in its inserted, non-locking position;

FIG. 10 is the same as FIG. 9, except that the connector bolt is turned to its locking position; and FIG. 11 is a section taken through the key of the connector bolt to show its relationship to a keyhole.

DETAILED DESCRIPTION OF INVENTION

Structures Formed from The Components

Figures 1, 1A:
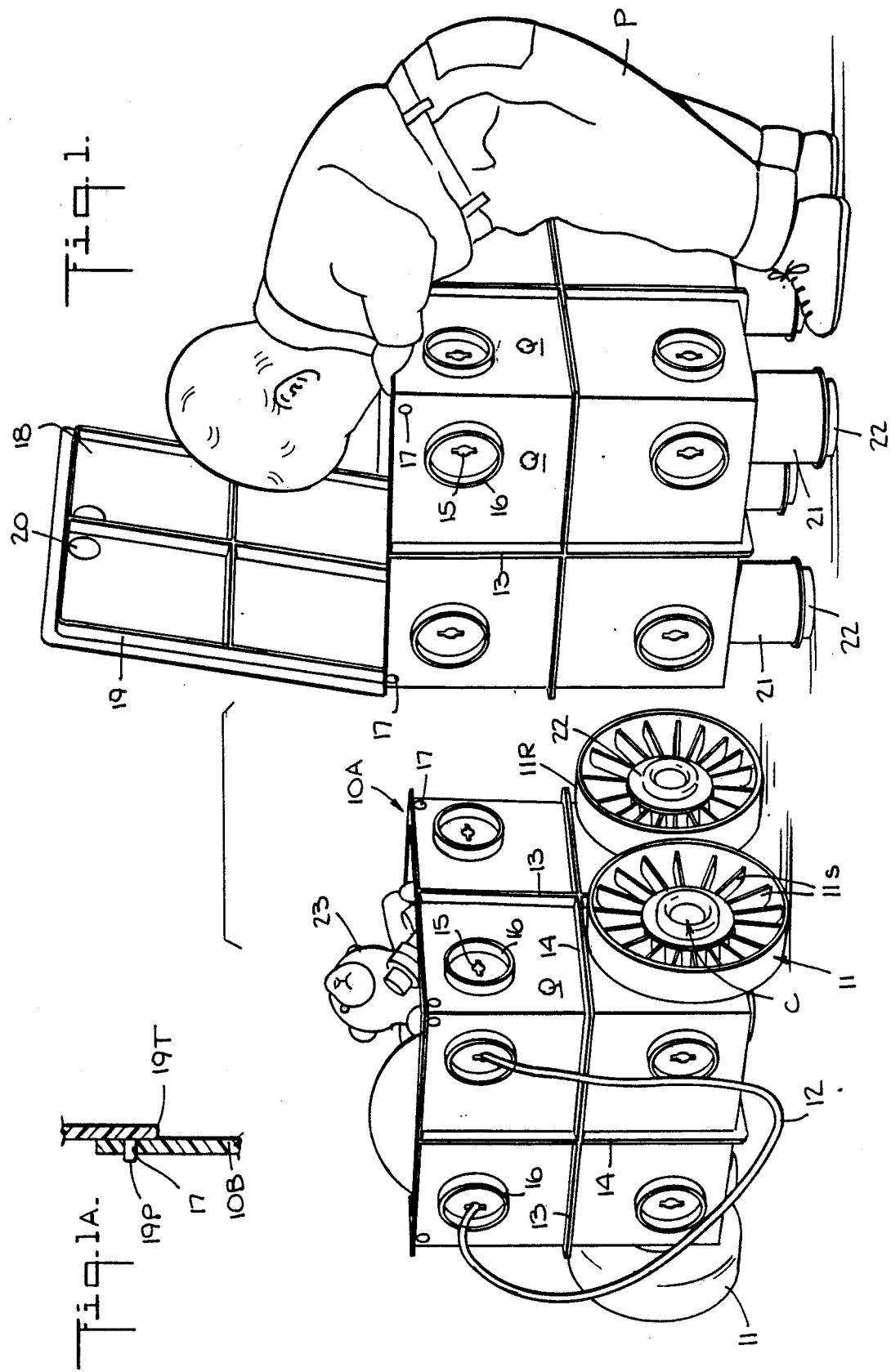
FIG. 1 shows, in perspective, two different structures that can be created from the components of a toy construction set in accordance with the invention, one being a wheeled wagon and the other a storage trunk for small toys.
FIG. 1A is a detail, showing in section, the hinge for the cover of the cubical box included in the set.

Referring now to FIG. 1 of the drawing, this figure illustrates two different structures made by a player (child P) from the components of a toy construction set in accordance with the invention, all of which are molded or otherwise fabricated of high-strength, synthetic plastic material, such as polyethylene or PVC. One of these structures is a wheeled wagon, the other being a storage box or trunk having a hinged cover.

The main components of the set are two identical open-top cubical boxes 10A and 10B, box 10A serving as the body of the wagon and box 10B as the body of an elevated storage trunk for toys or other small objects. The bottom and side walls of the open-top boxes 10A and 10B are divided by intersecting vertical and horizontal reinforcing ridges 13 and 14 into square quadrants Q. Each quadrant has a keyhole 15 therein whose configuration is defined by a rectangular slot crossed by a circular opening to impart wings to the circular opening. Hence admittable into keyhole 15 is a key having a similar winged shape. Encircling each quadrant keyhole 15 is a coupling collar 16 which projects from the quadrant.

To assemble the wagon from components included in the construction set, front and rear wheels 11 having cylindrical hubs are slipped over spacers mounted on coupling collars of appropriate quadrants on opposing walls of box 10A, the spacers then serving as the axles of these wheels.

Each wheel 11 is provided with spokes 11S extending radially from the hub of the wheel to its annular rim 11R. A pull rope 12 is provided for the wagon, the rope ends going through keyholes 15 in opposing side wall quadrants of box 10A and being knotted to retain the rope ends in the box.

Applied to the outer end of each spacer is a hub cap 20 having a center keyhole in which a connector bolt C having a key at one end is inserted, the bolt extending through the spacer and its key passing into the related quadrant keyhole, after which the bolt is turned to cause the key to fall out of registration with the quadrant keyhole and lock the assembled component in place.

To create the storage trunk, box 10B is raised above ground by four cylindrical spacers 21 which are fitted onto coupling collars 16 on the four quadrants on the bottom wall of the box. Spacers 21, which in this instance function as legs, rests on hub caps 22 which function as feet. The components so assembled are locked in place by connector bolts whose keys pass through the quadrant keyholes.

At the upper edge of each box side wall adjacent the corners of the box are bearing holes 17, so that each side wall has a pair of such holes for receiving the hinge pins of a removable cover 18, this cover being used only in connection with the trunk. To facilitate connection of cover 18 to box 10B to provide a hinged lid for the trunk, parallel side flanges 19 on the underside of cover 18 are provided at their ends with flexible free tongues. Each free tongue 19T, as shown separately in FIG. 1A, has a hinge pin 19P projecting therefrom which go into a bearing hole 17 in the side of a box. The tongues are readily deflected to effect insertion of a hinge pin or its removal from a bearing hole.

Since all side walls of the boxes have a pair of bearing holes 17 at their upper edges, it becomes possible for a player to hinge cover 18 to any side wall he selects. In this way, depending on how the box is oriented in the structure built by the player, the cover can be set to swing up or down, or sideways. Cover 18 is provided with a pair of finger holes 20 so that no handle is necessary, and the child can lift the cover simply by inserting his fingers in these holes In FIG. 1, the child player P is shown removing objects from the storage trunk whose hinged cover 18 is raised. It is clear from the relative sizes of the player and the boxes that the structures are large scale and that the boxes are large enough to accommodate the player.

The components which make up the construction set are identified by their primary function. However, save for the connector bolts, each component is capable of carrying out other structural or ornamental functions, depending on how they are put to use by the player. Thus in FIG. 1, hub caps 22 function as such on the wagon wheels, but act as the feet of pedestals on the trunk. The hub caps, as will later be evident, can also function as headlights or simulated eyes. Spacers 21 can function as such or as the axles of the wheels. Wheels 11 can also function as enlarged structural feet or simulated ears.

The function to which each component is put depends on the creative imagination of the player. The nature of the construction toy is such that the range of structural possibilities is broad, thereby enhancing the play potential of the toy.

For example, one play activity a child may carry out after erecting the storage trunk and pull wagon shown in FIG. 1, is to place his favorite toy figures in the storage trunk, and then decide which figures have earned the right to a joy ride, at which point the child transfers these figures, including the toy teddy bear 23, to the open box 10A of the wagon, and then pull the wagon to give these fortunate figures a joy ride. Or he may join teddy bear 23 in the wagon and have another child pull the wagon.

Because spokes 11S of wheels 11 are in the form of radial fins, and the axles on which these wheels are supported are cylindrical spacers of relatively large diameter, the toy wagon is capable of sustaining relatively heavy loads, and the wagon created from components of the set is by no means fragile.

Referring now to FIG. 2, there is shown another structure created from components of the set, in this instance a double-section vehicle or tractor-trailer in which the two open-top boxes 10A and 10B are spaced apart in tandem relation by cylindrical spacers 21, the boxes being bolted together by connector bolts which go through the spacers. Front wheels 11 are mounted on appropriate quadrants on opposing side walls of box 10A, while rear wheels are mounted in appropriate quadrants of box 10B which forms the rear section of the vehicle.

To simulate headlights, hub caps 22 are mounted on coupling collars 16 of the upper front quadrants of box 10A. Rope 12 in this instance has its ends inserted in keyhole 15 of opposing quadrants of box 10A. The child, if he wishes, may attach cover 18 to the rear box 10B of the vehicle and thereby provide a seat for the driver.

Referring now to FIG. 3, there is shown a two-tier storage cabinet assembled from the components of the construction set. Box 10B is raised above box 10A and supported thereabove by four cylindrical spacers 21 which fit on the coupling collars of those quadrants of box 10B which face corresponding quadrants of box 10A.

Box 10A in this structure is oriented so that its open top faces the front, this box being raised above ground by four wheels 11 whose cylindrical hubs are fitted a the four quadrant coupling collars at the bottom of the box. Wheels 11 in this instance serve as enlarged feet to stabilize the structure. The upper box 10B is joined to the lower box 10A by spacers 21. Cover 18 is hinged to box 10A so that one must swing up the cover to obtain access to this storage compartment which the child may fill with small toys or other objects.

Upper box 10B is oriented so that its open top is to one side at right angles to the open top of box 10A. The upper compartment can be used to store books, such as book 24. In practice, the child may erect this structure so that the open top of the upper box faces the rear or the front, or the other side, for the components lend themselves to any arrangement that strikes the fancy of the player.

For purely decorative purposes, mounted on the coupling collars on the upper front quadrants of box 10B are spacers 21 capped by hub caps 22 which in this instance simulate eyes. If now the player wishes to convert this two-tier cabinet to a robot, he can orient the upper box so that the open top is at the rear, and the simulated eyes are at the front, wheels being then coupled to the opposing side quadrants of the box to simulate enlarged ears.

As will become evident from the detailed description to follow of the components which make up the set, these components are multi-functional and can be assembled together in various ways and interconnected to create not only the above described structures but other structures conceived by the player. It will also be evident that the more components that are included in the set, the greater is the range of different structures that can be assembled from these components.

Set Components

Figure 6:
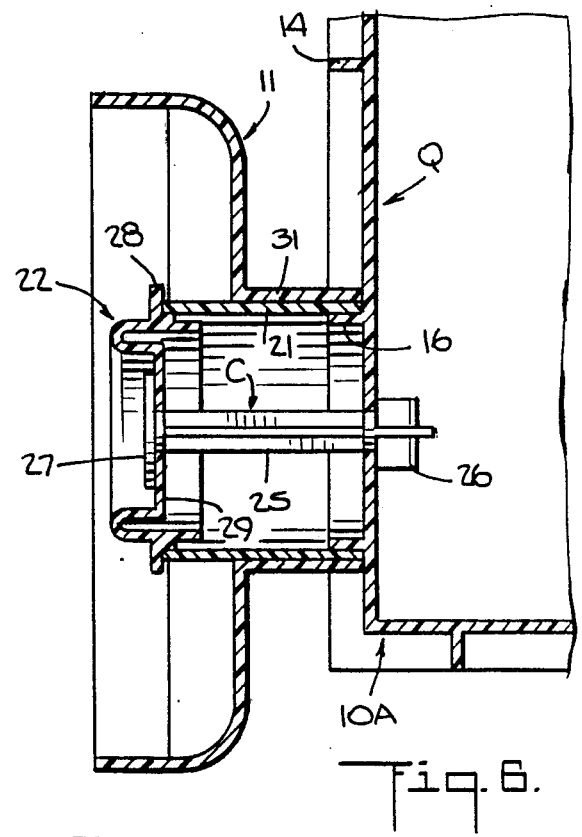
FIG. 6 is section taken through the sub-assembly shown in FIG. 4 in which a hub cap is joined by a connector bolt to a spacer mounted on a quadrant coupling collar, a wheel being rotatable on the spacer.

Referring now to FIGS. 4 and 6, all components which make up the construction set are shown except for the main components, boxes 10A and 10B. Only a portion of box 10A is illustrated to provide a quadrant coupling collar 26 on which to mount the components.

The means by which the components assembled by the player can be interconnected are constituted by a plurality of connector bolts C, one of which is shown in FIGS. 4 and 6. Bolt C includes a shank 25 whose length is substantially equal to that of a spacer. Shank 25 has a cruciform cross section, so that even though the bolt is molded of synthetic plastic material, the shank is highly resistant to flexure.

Integral with the front end of shank 25 is a key 26 having a winged formation so that the key is insertable through the winged keyholes in the hub caps and in the quadrants. At the junction of shank 25 and key 26 is a circular disc 26J whose diameter substantially matches the diameter of the circular opening included in a keyhole, as shown in FIG. 11. The enlarged head 27 at the other end of shank 25 serves as an abutment and is disc shaped, although in practice it may be in any other suitable head configuration.

Cylindrical spacer 21 has an inner diameter which substantially matches the outer diameter of the quadrant coupling collar 16; hence the spacer is adapted to fit over the collar and extend therefrom. Wheel 11 is provided with a cylindrical hub 31 having substantially the same length as spacer 21 and having an internal diameter that substantially matches the outer diameter of the spacer. Hence one can slip the wheel over the spacer which then functions as an axle for the wheel, and the wheel is free to rotate on the spacer.

Hub cap 22 is provided with a leading cylindrical section 32 whose diameter is such that it is receivable in the outer end of spacer 21 or in the outer end of wheel hub 31, depending on how the components are assembled. Hub cap 22 also includes an annular flange 28 whose diameter exceeds that of the spacer and the wheel hub, so that when the hub cap is applied to either member, it lies against its outer end. The circular membrane 29 of hub cap 22 has a keyhole 30 at its center which matches the quadrant keyhole 15.

Thus to interconnect the sub-assembly of components shown in FIGS. 4 and 6 so as to mount a wheel 11 on coupling collar 16 of quadrant Q, connector bolt C is inserted through keyhole 30 of hub cap 22, the key 26 passing through keyhole 15 of quadrant Q, so that the head of the bolt then engages membrane 29 of the hub cap and shank 25 bridges the membrane and the quadrant.

The bolt is then turned to its locking position, so that the wings of key 26 are caused to fall out of registration with the wings of the quadrant keyhole, thereby locking together the components of the assembly. Membrane 29 of the hub cap is flexible and has a convex formation (see FIG. 8), so that when it is pressed in by the head of the bolt which engages the membrane, the membrane imposes a tension on the bolt to maintain it in its locked state.

Figure 5:
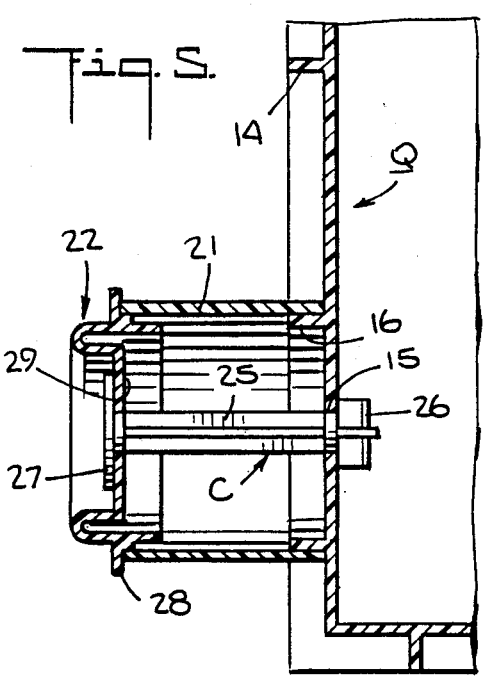
FIG. 5 is a longitudinal section taken through a sub-assembly constituted by a hub cap joined by a connector bolt to a spacer mounted on a quadrant coupling collar.

The sub-assembly shown in FIG. 5 omits the wheel, so that it is hub cap 22 that is joined by connector bolt C to spacer 21 mounted on quadrant coupling collar 16. It is to be noted that in FIG. 1, wheels 11 functioning as enlarged feet are directly connected to quadrant coupling collars, and are locked thereon by means of connector bolts and hub caps that sit within the wheels in the space defined by rim 11R whose width is greater than that of spokes 11S.

Figure 7:
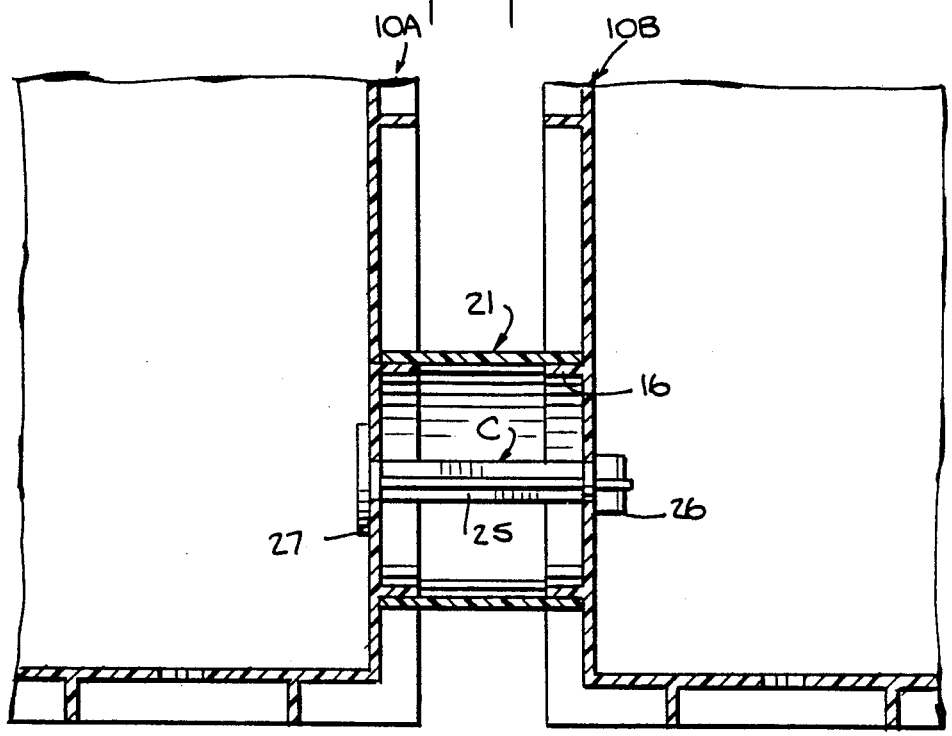
FIG. 7 is a sectional view of a pair of cubical boxes which are spaced apart by a spacer whose ends fit over corresponding quadrant coupling collars, the spaced boxes being interconnected by a connector bolt.

FIG. 7 illustrates the manner by which boxes 10A and 10B are joined together by a spacer 21 whose opposing ends fit on coupling collars 16 on the box quadrant which face each other, a connector bolt C going through the spacer to bridge the quadrants and interconnect the boxes.

FIGS. 8 to 11 illustrate the manner in which a hub cap 12 is joined to a spacer 21 mounted on a quadrant collar 16, the quadrant having a keyhole 15. It will be seen in FIG. 8 that membrane 29 of hub cap 22 is convex and has a center keyhole 30 which admits the connector bolt. As shown in FIG. 9, key 26 passes through the quadrant keyhole 15, junction disc 26J then lying within the circular opening in this keyhole. When the connector bolt is pressed in to flatten flexible membrane 29 and the bolt is turned, as shown in FIG. 10, this causes the key to fall out of registration with the quadrant keyhole, and the bolt is then locked in place. To disassemble these components, one has only to again turn the key to bring it in registration with the quadrant keyhole, permitting withdrawal of the connector bolt.

While there has been shown and described a preferred embodiment of a construction toy set in accordance with the invention, it will be appreciated that many changes and modifications may be made therein without, however, departing from the essential spirit thereof.

We claim:

1. A construction toy set whose components are interconnectable to create various structures, depending on how the components are assembled, said set comprising:
  (a) at least one open-top cubical box whose bottom and side walls are divided into quadrants, each having a keyhole therein encircled by a coupling collar projecting from the quadrant;
  (b) a plurality of like cylindrical spacers which are fittable on respective collars and extend therefrom;
  (c) a plurality of wheels having a cylindrical hub of substantially the same length as said spacers and a larger diameter, whereby each wheel may be slipped over a spacer extending from a coupling collar, the spacer then acting as an axle for the wheel;
  (d) a plurality of like hub caps adapted to lie against an outer end of the spacer and against the hub of said wheel, each hub cap having a membrane with a center keyhole whose shape matches the quadrant keyhole; and
  (e) a plurality of like connector bolts each having a shank whose length is substantially equal to that of said spacers and a key at the end of the shank which is shaped to be admissible in said quadrant keyhole and said membrane center keyhole, whereby when a connector bolt is inserted in the membrane center keyhole and the key passes through the quadrant keyhole, and the shank of the bolt then extends through a spacer, the connector bolt can be locked by turning the bolt to cause the key to fall out of registration with the quadrant keyhole.

2. A set as set forth in claim 1, wherein all the components are fabricated of synthetic plastic material.

3. A set as set forth in claim 1, wherein said box is divided into quadrants by intersecting vertical and horizontal reinforcing ridges.

4. A set as set forth in claim 1, wherein the inner diameter of each spacer substantially matches the outer diameter of each coupling collar.

5. A set as set forth in claim 1, in which each wheel includes fin-like spokes radiating from the hub and extending to an annular rim.

6. A set as set forth in claim 1, wherein each hub cap has an annular flange having a diameter which exceeds the diameters of the hub and the spacers.

7. A set as set forth in claim 1, wherein said membrane is convex and deflectable.

8. A set as set forth in claim 7, wherein said bolt has a disc-shaped head which presses against said membrane when the hub cap is affixed to the box.

9. A set as set forth in claim 1, wherein said center and quadrant keyholes have a winged configuration and a circular opening.

10. A set as set forth in claim 9, wherein said key has a winged configuration and a disc at the junction of the key and the shank, which disc fits into the circular opening.

11. A set as set forth in claim 10, wherein said shank has a cruciform cross section.

12. A set as set forth in claim 10, wherein each side wall has at its upper end a bearing hole adjacent a corner of the box whereby each side wall has a pair of holes to receive the hinge pin of a removable cover.

13. A set as set forth in claim 12, wherein said cover has parallel side flanges at its underside.

14. A set as set forth in claim 13, wherein each side flange has a flexible free tongue on which a hinge pin is mounted.

* * * * *

UNITED STATES PATENT AND TRADEMARK OFFICE
CERTIFICATE OF CORRECTION

PATENT NO. : 4,963,115

DATED : October 16, 1990

INVENTOR(S) : Davin Stowell and Jean M. Gerth

It is certified that error appears in the above-identified patent and that said Letters Patent is hereby corrected as shown below:

On the title page, under item [19], "Stowell Davin et al." should read --Stowell et al.--; and in item [75], the name of the first inventor should read --Davin Stowell--.

Signed and Sealed this

Seventh Day of January, 1992

Attest:

HARRY F. MANBECK, JR.

*Attesting Officer*  *Commissioner of Patents and Trademarks*